United States Patent
Asselstine et al.

(10) Patent No.: US 7,933,860 B2
(45) Date of Patent: Apr. 26, 2011

(54) METHOD AND SYSTEM FOR ELECTRONIC ARCHIVAL AND RETRIEVAL OF ELECTRONIC COMMUNICATIONS

(75) Inventors: Carol Vaughn Asselstine, Edina, MN (US); Sherry Comes, Castle Rock, CO (US); Jason A. Erickson, Frisco, TX (US); Suzan Gail Kaufmann, Roseville, MN (US); Stuart A. Mears, East Sussex (GB); Todd A. Nowacki, Minneapolis, MN (US); James C. Peterson, Lindstrom, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 414 days.

(21) Appl. No.: 12/127,767

(22) Filed: May 27, 2008

(65) Prior Publication Data
US 2008/0270491 A1    Oct. 30, 2008

Related U.S. Application Data

(63) Continuation of application No. 10/918,558, filed on Aug. 13, 2004, now Pat. No. 7,412,489.

(60) Provisional application No. 60/496,795, filed on Aug. 21, 2003.

(51) Int. Cl.
*G06F 15/16* (2006.01)
*G06F 15/173* (2006.01)

(52) U.S. Cl. .......... 707/206; 709/217; 709/225; 709/246

(58) Field of Classification Search .................... None
See application file for complete search history.

(56) References Cited

U.S. PATENT DOCUMENTS

| | | | |
|---|---|---|---|
| 5,890,163 A * | 3/1999 | Todd | 1/1 |
| 6,135,646 A | 10/2000 | Kahn et al. | |
| 6,304,915 B1 | 10/2001 | Nguyen et al. | |
| 6,728,761 B2 | 4/2004 | Decime | |
| 7,412,489 B2 | 8/2008 | Nowacki et al. | |
| 2002/0035607 A1 | 3/2002 | Checkoway et al. | |
| 2002/0087704 A1 | 7/2002 | Chesnais et al. | |
| 2004/0133645 A1 * | 7/2004 | Massanelli et al. | 709/206 |

* cited by examiner

*Primary Examiner* — John B. Walsh
(74) *Attorney, Agent, or Firm* — Snell & Wilmer L.L.P.

(57) ABSTRACT

The system receives an electronic communication, reviews the electronic communication to determine content of the electronic communication, applies rules to the content to determine a category associated with the electronic communication, wherein the rules relate to at least one of federal law, federal government regulations, state law, state government regulations, industry standards and administrative policies; and, stores the electronic communication based on the category.

15 Claims, 2 Drawing Sheets

US 7,933,860 B2

METHOD AND SYSTEM FOR ELECTRONIC ARCHIVAL AND RETRIEVAL OF ELECTRONIC COMMUNICATIONS

CROSS-REFERENCE TO RELATED APPLICATIONS

This application is a continuation of U.S. Ser. No. 10/918,558, filed on Aug. 13, 2004, and entitled "METHOD AND SYSTEM FOR ELECTRONIC ARCHIVAL AND RETRIEVAL OF ELECTRONIC COMMUNICATIONS." The '558 application claims the benefit of U.S. Provisional Patent Application Ser. No. 60/496,795, filed Aug. 21, 2003 with the same title, both of which are hereby incorporated by reference.

BACKGROUND OF THE INVENTION

The present subject matter relates to archiving electronic communications. More specifically, the present subject matter relates to monitoring, capturing, archiving and retrieving electronic communications in an organization network or system.

Archiving and retrieval of selected communications and/or documents, such as e-mail messages, to be in compliance with applicable regulations is known. For example, the securities and exchange commission (SEC), a governmental body involved in the regulation of securities, issues a variety of such archiving and retrieval regulations and requirements that organizations involved in the securities business must meet. Existing techniques often involve time consuming and labor intensive solutions that include the physical copying of communications or documents. Some archiving and retrieval methods and systems are entirely paper based where paper copies of all relevant communications and documents are physically copied and physically stored at a secure site. Subsequently, stored information is manually searched and accessed to satisfy authorized request for retrieval of stored information.

Existing archiving and retrieval techniques involve manual and semi-automated copying and storage of electronic communications in an organization. For example, in an electronic-mail (e-mail) system in a securities organization, one existing and known archiving and retrieval technique involves both manual copying and storage of physical copies of communications to be archived. First, there is created a monthly archive storage tape back-up of all communications in e-mail servers in an organization location. The tapes containing the archived e-mails are then sent to a physical location for secure storage. Subsequently, an e-mail retrieval request is submitted for processing through a designated office or department of the organization, for example the law department. Upon approval of the request, the appropriate storage tapes are requested from the storage location and loaded to an available server. Selected e-mail messages stored on the loaded tape can then be retrieved and reviewed by a responsible or designated office, department or individual.

Existing communications archiving and retrieval systems and processes typically require extensive manual and physical copying of the information to be archived. The reliance on physical duplication and physical transport of information to be archived to and from a secure location makes existing archiving and retrieval systems time consuming, inefficient and expensive. The archiving and retrieval of the information is cumbersome since individuals must physically duplicate information for archiving and search for and physically retrieved stored information after an authorized request.

Further, existing archiving and retrieval systems and techniques that employ computers are typically limited to computerized networks with a small number of e-mail users and limited data storage requirements. Also, existing archiving and retrieval systems and techniques often experience drawbacks in large scale systems with a large number of communications and e-mail boxes and high data storage requirements. The drawbacks include slower and unreliable archiving and retrieval of the electronic communications, insufficient data storage space and the loss of data integrity.

There is thus a need for a system and method for archiving and retrieving communications in a large organization or an organization with a large volume of communications to be archived which enables the organization to effectively comply with applicable regulations relating to the business conducted by the organization.

SUMMARY OF THE INVENTION

There is provided a method and system for archival and retrieval of communications and related documents that uses hardware and software to selectively monitor, capture, catalog and retrieve electronic communications and documents relating to the business of employees or individuals of the organization and which allows the organization to effectively comply with applicable regulations, such as governmental regulations relating to the storage of such communications and documents. Archived electronic communications and information are stored in a third party computer storage medium and accessible by authorized individuals using a secure network connection, such as an intranet web interface, or an online intranet browser connection which enables a user to immediately search and retrieve selected archived data and information. The system and method for archiving and retrieving communications is advantageously implemented in an organization with a large volume of electronic communications.

There is provided a system for archiving and retrieving electronic communications having a first computer having an e-mail application and a web browser application; an e-mail server in communication with the first computer, the e-mail server adapted to enable creation of an electronic communication having a first data format and an automatic copy of the electronic communication; a message relay system in communication with the e-mail server, the message relay system adapted to receive the copy of the electronic communication and convert the copy of the electronic communication between the first data format and a second data format; an archiving server in communication with the message relay system, the archiving server adapted to receive the copy of the electronic communication in the second data format transmitted from the message relay system; and the archiving server adapted to index and store the copy of the electronic communication in an associated storage means. The stored electronic communication is retrievable by an authorized user via a secure network connection, such as a secure intranet web site, web interface or online connection over private communication links. Also, in one aspect of the system, the message relay system is adapted to buffer the copy of the electronic communication until confirmation is received that the electronic communication has been received at the archiving server, and is adapted to capture and store error messages generated when the copy of the electronic communication is undeliverable to the archiving server.

There is also provided a method for securely retrieving archived electronic communications from an archiving system. The method includes the steps of initiating a request for retrieval of a selected archived electronic communication, determining whether the request meets a first approval criteria. If the request does not meet the first approval criteria, then the request is denied. If the request does meet the first approval criteria, a next step includes determining whether the request meets a second approval criteria. If the request does not meet the second approval criteria, then the request is denied. If the request meets the second approval criteria, a next step is executing the request to access and retrieve the selected electronic communication from the archiving system storage medium. In an alternate aspect, before executing the request to access and retrieve the selected electronic communication from the storage medium, determining whether to process an audit service request and, after approval of the audit service request, delivering the retrieved selected archived electronic communication to a designated individual. The method can also comprise storing a denied request in a local storage medium and generating a status notice for the request.

It is an objective to provide an archival and retrieval method and system to effectively capture, archive and retrieve electronic communications in a large scale computing environment.

It is also another objective to provide an archival and retrieval method and system, having a message relay system, to efficiently and reliably archive and retrieve electronic communications.

It is another objective to provide an archival and retrieval method and system that archives and retrieves electronic communications and documents in an environment having a large number of e-mail users and a large volume of e-mail communications.

It is further an objective to provide an archival and retrieval method and system that enables an organization to comply with governmental regulations requiring the archiving and retrieval of electronic communications relating to the business of employees and/or other designated individuals in an organizations.

It is an objective to provide an archival and retrieval method and system that uses a message relay system to enable the monitoring, capturing, cataloging and retrieval of electronic communications.

It is an objective to provide an archival and retrieval method and system that will minimize or avoid penalties resulting from inadequate and mandatory record keeping requirements of communications relating to regulated securities.

It is an objective to provide an archival and retrieval method and system adapted to effectively capture error messages related to the archiving of electronic communications at a central location or message relay system.

It is still another objective to provide archival of all incoming and outgoing e-mail communications for a defined period of time.

It is also an objective to provide a retrieval method and system for archived communications that ensure controlled access via a secure website to the archived communications by authorized and/or designated individuals.

It is an objective to provide a retrieval method and system for archived communications that enables authorized and designated individuals to execute the retrieval process, including at least a requester, an approver, and a retriever.

It is yet another objective to provide a retrieval method for archived communications having defined roles and responsibilities to assure information and access security.

It is still another objective to provide a retrieval method and system for archived communications having defined roles and responsibilities that serve as points of control in retrieval method to insure that access and retrieval of e-mail communication and information meets legal standards and regulations.

It is a further objective to provide a retrieval method and system for archived communications to permit an organization to quickly and easily respond to a request for an email or other electronic record by a regulatory or governmental agency, such as the securities and exchange commission (SEC).

Additional objects, benefits, advantages and novel features of the subject matter will be set forth in part in the description which follows, and in part will become apparent to those of ordinary skill in the art upon examination of the following and the accompanying drawings or may be learned by practice, production or operation of the subject matter. The objects and advantages of the concepts and subject matter may be realized and attained by means of the methodologies, instrumentalities and combinations particularly pointed out in the appended claims.

BRIEF DESCRIPTION OF THE DRAWINGS

The drawings and figures depict one or more implementations in accord with the present concepts and subject matter; by way of example only, not by way of limitation. In the figures, like reference numerals refer to the same or similar elements. The description may be better understood when read in connection with the accompanying drawings, of which.

DETAILED DESCRIPTION

Figure 1:
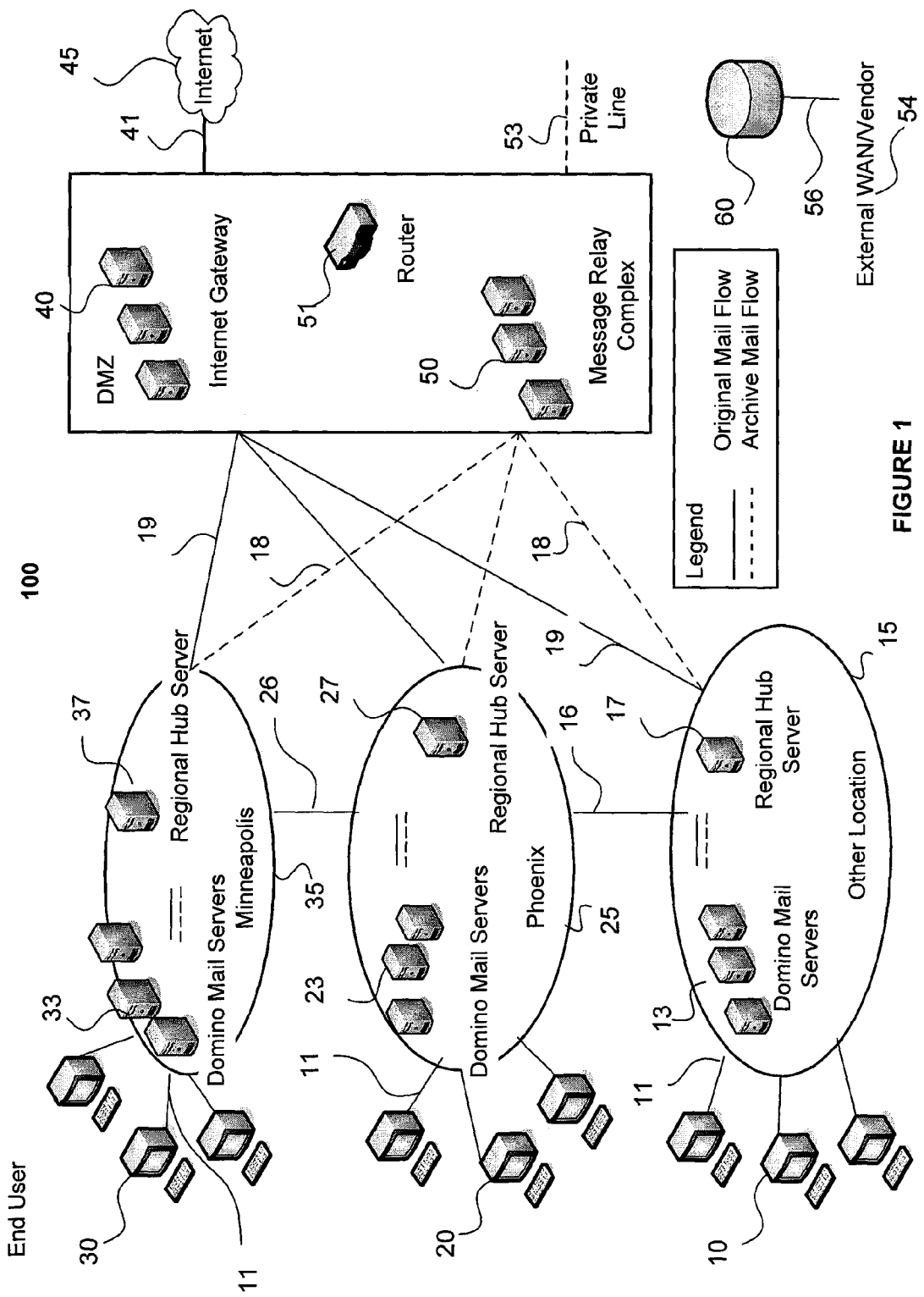
FIG. 1 illustrates a system and application flow of an archival and retrieval system for electronic communications according to one aspect of the present subject matter.

FIG. 1 illustrates an archival and retrieval system 100 that can be implemented to monitor, capture, archive, and retrieve electronic communications, messages, and/or documents. In one aspect, all archived electronic communications and information are stored in an accessible computer storage medium in an archiving system that permits authorized individuals to access, search and retrieve archived data and information using a secure network connection, such as an intranet web interface, or other online intranet browser connection.

As shown in FIG. 1, the archiving and retrieval system 100 has one or more organization networks 15, 25 and 35 interconnecting end user computers or machines 10, 20 and 30, e-mail servers 13, 23, 33 and corresponding regional hub servers 17, 27 and 37. Those ordinary skill in the art will recognize that the organization networks 15, 25 and 35 can be local area networks (LAN), wide area networks (WAN) or other known types of networks. The system 100 has an internet gateway or server 40 that enables communications outside of the organization via an internet 45 communications link 41 that enables e-mails to be transmitted to or received from an external e-mail recipient. The system 100 also includes, in one embodiment, a message relay system or complex 50, a router 51 and private or dedicated communications links 53 to enable copies of e-mails or electronic communications to be transmitted to and received from an external vendor or third party archiving system 55 where the electronic communications are indexed, stored and archived in a selected data storage facility or medium 60. Communication between components and devices may be conducted through a plurality of communication links 11, 16, 18, 19, 26, 41 and 53 which enable bi-directionally transmission of data and information. The communication links 41 and 53 may be public or private and secure communications links as required in the system 100.

The archiving and retrieval system 100 has at least one network 15, 25 and 35 where a plurality of end users 10, 20 and 30 are connected to associated e-mail servers 13, 23 and 33 that enable an end user to create, send and receive e-mails using an e-mail application. In one aspect, the e-mail servers 13, 23 and 33 can be Domino Lotus Notes e-mail servers or other e-mail servers known to those of ordinary skill in the art. The e-mail servers 13, 23, 33 are in communication with a corresponding regional hub server 17, 27, and 37 that manages electronic communications traffic, e.g., e-mails that arrive or exit at the regional hub server 17, 27 and 37.

The e-mail servers 13, 23 and 33 may include one or more dedicated e-mail copy software or applications that enable the capture or copying and transmission of all or selected electronic communications, i.e., e-mails, to the regional hub servers 17, 27 and 37. The e-mail copy software or application can be created specifically to execute the capture and copy aspect or can be provided by a third party vendor for loading on the Lotus Notes e-mail server 13, 23, and 33 as will be appreciated by those of ordinary skill in the art. Further, the capture, copy and sending of the electronic communications may be carried out as a background function or process that is transparent to the end user 10, 20 and 30. A path 18 of the captured messages or communications in the system 100 is shown in FIG. 1 as a dotted or broken line. In one specific example, the captured electronic communications can relate to securities and securities related communications of a member, broker, dealer, employee, contractor or advisor of the financial services organization. Those of skill in the art will readily recognize that the captured communication may relate to any subject matter selected by the organization.

The regional hub servers 17, 27 and 37 can be responsible for managing and directing the electronic communications received from the e-mail servers 13, 23, 33 to an external location from regional networks 15, 25 and 35 in the system 100, and vice versa. The regional hub servers 17, 27 and 37 can also manage and direct any captured electronic communications received from the e-mail servers 13, 23, 33 and forward to the message relay complex 50 in the electronic archival and retrieval system 100 for subsequent transmission and archiving in the external vendor or third party system 55. The regional hub servers 17, 27, 37, shown in FIG. 1, can be responsible for electronic communications traffic for a physical location or region, e.g., Minneapolis, Minn., and can also communicate with another network regional hub server in another location, e.g., in Phoenix, Ariz., though a direct communication link 16 or 26, the internet gateway 40 or with the message relay complex 50. In the system 100 of FIG. 1, each regional hub server 17, 27 and 37 has similar functional capabilities. For example, electronic communications arriving at the internet gateway or servers 40 from the regional hub servers 17, 27 and 37 can be transmitted via an associated communications link 41 and the internet 45 to a delivery or intended destination. Conversely, electronic communications arriving at the internet gateway or servers 40 from the internet 45 can be transmitted to a regional hub server 17, 27 or 37 for delivery to an intended internal destination or end user 10, 20 or 30.

Alternatively, the regional hub servers 17, 27 and 37 can have one or more dedicated software applications that enable the capture or copying and transmission of all or selected electronic communications, i.e., e-mails, for forwarding to the message relay complex 50 in the electronic archival and retrieval system 100 for subsequent transmission to and archiving in an external vendor or third party system 55 storage location 60. The capture, copying and transmission of e-mails can be done automatically, i.e., without specific sender or recipient instructions to do so for each e-mail, without the e-mail sender or recipient being aware the process is occurring.

The message relay complex 50 receives electronic communications, such as e-mail messages, previously captured and copied by the one or more e-mail servers 13, 23, 33 or regional hub 17, 27, 37 servers. The message relay complex 50 may be an interface between the source organization and the archiving or destination computer system 55, which can include a wide area network (WAN) 54 with e-mail receiving and archiving servers, as well as the data storage or repository medium 60. The message relay complex 50 is responsible for transmitting the captured electronic communications to the external archiving system 55 or network 54. In this manner, the message relay complex 50 reduces the load on the e-mail servers 13, 23, and 33 and regional hub servers 17, 27 and 37 used in the system 100 by being responsible for forwarding messages or captured communications to the archiving system 55. Those of ordinary skill in the art will readily recognize that the archiving system 55 can be a physically external system and can be provided by a third party vendor.

The message relay complex 50 may enable the translation or conversion of captured electronic communications between a first format and a second format of the destination and archiving system 55. For example, the message relay complex 50 may convert or translate the captured e-mails from a Lotus Notes format to the native simple mail transfer protocol (SMTP) mail format at the archive system 55. This enables the translating or converting of formats to be carried out outside the normal e-mail delivery stream and outside the lotus notes system 17, 27 and 37 where the e-mail message originated. Those of ordinary skill in the art will readily recognize that other formats can be used where desired or required by the originating and archiving organization. This capability reduces the load and required functions in the lotus notes system 17, 27 and 37 where the e-mail message originated. The message relay complex 50, as a separate facility, thereby improves the reliability of the e-mail system in the originating system and minimizes the impact of the translation or conversion aspect on the originating e-mail system.

The message relay complex 50 also serves as a storage means or medium for captured a-mails in transit to the destination or archiving system 55. The message relay complex 50 includes local internal or external data storage capacity for the storage of electronic communications. The message relay complex 50 storage can be used for storage of e-mail messages normally in the course of transmission to or from the archiving system 55 or can be used in the event of loss of communication between the originating system or arching system 55, or in the event that the archiving system is unavailable. The message relay complex 50 can also store the e-mail messages until confirmation is received that the transmitted a-mails have been received at the archiving system 55. The message relay complex 50 can be adapted to store the e-mails messages for a preset time period, e.g., five (5) hours or days, or until a defined condition is met, e.g., confirmation that the e-mail has been received In the event of delivery or transmission failure of electronic communications to the archiving system 55, the message relay complex 50 can store and accumulate undelivered e-mail messages while reliable communications are restored and thereby eliminate or minimize the loss of the captured e-mails. The message relay complex-50 can buffer or pool the electronic communications in local storage until service is restored. In this manner, the message relay complex 50 prevents data loss of undeliverable messages or communications which cannot be transmitted due to the loss of a communications link or the archiving system network 54 being offline and unable to accept transmissions. The message relay complex 50 can store all undeliverable electronic communications and messages until they are re-transmitted and received at the third party archiving system 55. This aspect of the message relay complex 50 enables one hundred percent (100%) delivery of electronic communications and messages to the designated third party archiving system 55. The message relay complex 50 thereby provides increased fault or error tolerance and improved reliability in the archiving of electronic communications.

The message relay complex 50 also serves as a central capture point for receiving, capturing, storing and addressing error messages generated when a e-mail message or electronic communication is undeliverable to or not receivable from the archiving system 55. For example, the message relay complex 50 can be adapted to capture and store error messages generated when problems are encountered in the e-mail format conversion process, in the delivery of captured e-mails to the archiving system 55, or the retrieval of archived e-mail messages from the archiving system 55.

The capture of error messages by the message relay complex 50 may be transparent to the end user so that the end user does not encounter error messages relating to error in archiving or retrieving electronic communications. This aspect effectively and advantageously removes the end user 10, 20 and 30 or mailbox owner from the error message collection and archiving process. Also, the message relay complex 50 may provide a convenient centralized location for a system administrator to access and review captured error messages for determination of necessary corrective action.

The message relay complex 50 may include multiple components and devices that execute software packages or applications for carrying out the specific or defined functions, task and capabilities described above. Those of ordinary skill in the art will readily recognize that applications or software can be added to the components and devices to carry out other functions and capabilities. The message relay complex 50 also includes internal or external storage capacity associated with and accessible by the message relay complex components.

In one example of the present subject matter, the message relay complex 50 includes three types of devices or components: a standard e-mail server having an e-mail application, a LINUX based e-mail server, and a load balancing computer. The standard e-mail server can be a standard NT based Intel architectured server that runs a Lotus Notes Domino e-mail application. The message relay complex 50 can have multiple standard e-mail servers for redundancy. The number of standard e-mail servers can vary to meet the traffic of electronic communications received, translated, and transmitted. Further, each standard e-mail server in the message relay complex 50 may include a translation or conversion software package or application that enables electronic communications to be converted from the Lotus Notes e-mail format to a simple mail transfer protocol (SMTP), and vice versa.

In an archiving mode, the message relay complex's 50 standard e-mail server receives a captured e-mail from the regional servers 17, 27 and 37, convert the e-mail from the first format, e.g., a Lotus Notes format, to the second format, e.g., an SMPT format, for subsequent forwarding of the converted message to the message relay complex's LINUX based e-mail server. In the retrieval mode, the message relay complex's standard e-mail server receives the retrieved e-mail from the message relay complex's LINUX based e-mail server and converts the e-mail message from a second format, e.g., SMPT, back to a first format, e.g., Lotus Notes, for forwarding of the converted message to the appropriate regional servers 17, 27 and 37.

The message relay complex's 50 LINUX based mail server can be a typical LINUX based server with standard applications that enable the LINUX based server to communicate with the archiving system 55 for the delivery of captured e-mails or for the retrieval of previously archived electronic communications. The LINUX based mail server executes e-mail and other applications that enable it to receive and transmit electronic communications, i.e., e-mails, in a second format, e.g., SMTP, that is compatible with the applications and platforms being used at the archiving system 55. The consistency or compatibility of the format of the LINUX based mail server and the archiving system 55 permits the message relay complex 50 to efficiently and reliably facilitate communications between the originating system and the archiving system 55. Those of ordinary skill in the art will recognize that the message relay complex 50 can also have multiple LINUX based mail server for redundancy and that the number of server can vary to meet the demand and traffic of transmitted or received electronic communications.

The message relay complex 50 further includes one or more load balancing computers or systems which contain applications that dynamically route traffic of electronic communications arriving at the message relay complex 50 to a most available standard e-mail server and/or LINUX based mail server which can then carry out appropriate actions or functions on the electronic communication. Further, the load balancing computers or systems can route incoming electronic communications around busy or offline servers to other available servers in the message relay complex 50 thereby augmenting the reliability and efficiency of the message relay complex 50.

The archival and retrieval system 100 can selectively monitor, capture, catalog and retrieve electronic communications and documents relating to the business of selected employees or individuals in an organization. Electronic communications can include e-mail communications and associated or attached documents, instant messaging communications, etc. In one case, the archival and retrieval system 100 can be implemented in a financial services organization network where government regulations require the archiving and retrieval of electronic communications and transactions relating to securities and securities related communications of a broker, dealer, employee, contractor or advisor.

Further, the archival and retrieval system 100 of FIG. 1 can be implemented in an organization with a large volume of electronic mailboxes and high volume data storage requirements. The system 100 architecture also improves and ensures data integrity of the electronic communications. In one aspect, the archival and retrieval system 100 operates in a networked environment having about 125,000 electronic mailboxes and a data storage volume of about 46 Tbytes/year to 100 Tbytes/year. The archival and retrieval system 100 enables the immediate capture of a large volume of e-mails and other electronic communications on a real-time basis, and facilitates the secure storage of that data and information for varying time periods, e.g., months, years, etc. Those of ordinary skill in the art will readily recognize that the system 100 can also be implemented in other environments in organizations where a smaller or larger volume of electronic communications is generated.

In one aspect of operation, an electronic communication or e-mail is created by an end user 10, 20 and 30 via an e-mail application running on a Lotus Notes Domino server. The created e-mail will have a first format that corresponds to the Lotus Notes server 13, 23 and 33. When the end user completes the e-mail, the send button is actuated for transmission of the e-mail through the internet 45, e.g., from sender A to receiver B, where receiver B may be outside the organization's system 100. When the e-mail is sent, the e-mail copy software or application on the e-mail server 13, 23 and 33 makes a copy the sent e-mail. The capture of the electronic communication or e-mail can be automatic and carried out as a background task making the capture transparent to the user 10, 20, 30. The captured e-mail is then forwarded to the regional hub servers 17, 27 and 37 for forwarding to the message relay complex 50, as illustrated by the dotted line in FIG. 1.

The message relay complex 50, in one embodiment, translates or converts the captured e-mail to an archiving system compatible format, and transmits the converted e-mail to the archival system 55. In the archiving mode, the message relay complex's 50 standard e-mail server receives the captured e-mail, which has a first format corresponding to the Lotus Notes server 13, 23, and 33. The message relay complex's 50 standard e-mail server translates or converts captured e-mail from the first Lotus Notes format to a second format that is compatible with the archiving system 55. In one case, the second format is SMTP, though other formats may be used. The transmission of the converted e-mail to the archiving system 55 can use a transmission control protocol/internet protocol (TCP/IP) such as simple mail transfer protocol (SMTP), however, other known protocols may instead be used. Also, the transmission of the e-mail to the archiving system 55 by the message relay complex 50 may be performed over a secure private network and private communications lines connecting the sending system and the destination archiving system 55. The converted or translated e-mail message is then forwarded to the message relay complex's LINUX based e-mail send server which can transmit the converted e-mail to the archival system 55 for archiving and storing the electronic communications.

When the transmitted and formatted e-mail message or electronic communication is received at the archiving system 55, the e-mail message is indexed, archived and stored for subsequent authorized searching and retrieval. The e-mail message may be digitally signed, stored and archived to the appropriate system storage media 60. In one aspect, archived electronic communications can be stored in a database and associated database management service. Electronic messages are indexed, and can also be replicated with copies sent to another location for added redundancy. Stored electronic communications, messages and related materials can be indexed by, and may be retrieved by, one or more of the following criteria, among other criteria: Sender (including forwarded e-mail); Recipient (including forwarded e-mail); Other recipients, including carbon copied and blind carbon copied (including forwarded e-mail); Special Field (as specified in the RFC 822 definition) defined by the customer; Lotus Notes items, defined by the customer; Subject; Message body content (including forwarded e-mail); Attachment name, file extension name, and attachment content; and/or Date Range.

Data and information can subsequently be accessed and retrieved in response to search requests submitted by an authorized user for retrieval of selected electronic communications or documents. Authorized individuals may connect to the archiving system 55 via a secure intranet connection using a dedicated intranet web interface or browser connection that enables immediately search and retrieval of desired data and information. Those of ordinary skill in the art will readily recognize that retrieval can also be implemented using an internet connection and web-service or web interface and an online browser connection, though such a connection may need added security features due to increased risk of exposure and unauthorized access on the internet.

Retrieval of previously captured and archived electronic communications is permitted by authorized users. The archival and retrieval system 100 permits rapid and convenient retrieval of selected data and information by authorized individuals using a standard web browser application running on the user's machine or personal computer (PC) via an intranet communications link. In one embodiment, retrieval of archived communications may be performed over a secure network connection and private communication data links.

In one aspect of operation, retrieval of archived a-mails is carried out using an end user machine 10, 20 and 30. A user opens a browser application on the user machine and enters a predetermined URL address, which connects the end user to a designated intranet website associated with the archiving system 55 that permits authorized user access. The user enters a user ID and password. Once the archiving system 55 has verified and authenticated the user, and/or the user machine, a secure web session is established, such as a secure socket layer (SSL) based sessions. Those of skill in the art will readily recognize that communications over the secure web session can use one or more of known communications protocols, including among others, transmission control protocol/internet protocol (TCP/IP), hypertext transfer protocol (HTTP), and file transfer protocol (FTP).

After securely accessing the archiving system 54, the user is permitted to enter access and query the archived electronic communications in the archiving system storage location 60. The user can then enter search criteria for searching and retrieval of designated records or e-mails, e.g., all e-mails created by "user A in Jan. 2003". The archiving system 55, in response to the authorized search requests, searches the system storage location and retrieves the found electronic communications, e-mail or documents. The search results can then be transmitted to the user in a new search results e-mail message that contains the found electronic communications, e-mail or documents.

In one aspect, the search results e-mail message is transmitted from the archiving system 55 to the message relay complex 50 via secure and private communication links 53. The message relay complex 50, in one embodiment, forwards the received search results e-mail message to the regional hub server 17, 27 and 37 that corresponds to the end user 10, 20 and 30 or other designated individual e-mail account that is to receive the search results. The regional hub server 17, 27 and 37 then forwards the received search results e-mail message to the corresponding e-mail server 13, 23 and 33 connected to the end user 10, 20 and 30 or designated e-mail account that is to receive the search results. The search results e-mail message can then be opened by an authorized user.

Additionally, in one aspect, the search results e-mail message received at the message relay complex 50 will have a format that corresponds to the archiving system 55, e.g., the SMTP second format discussed previously. In this case, the message relay complex's LINUX based e-mail server forwards the received search results e-mail message to the message relay complex's standard e-mail server. The message relay complex's standard e-mail server then converts the search results e-mail message from the second format, i.e., SMPT, to a first format, e.g., a Lotus Notes format, that is compatible with the destination e-mail server 13, 23, and 33.

The message relay complex's standard e-mail server then forwards the converted search results e-mail message to the appropriate regional hub server 17, 27 and 37. The regional hub server 17, 27 and 37 then forwards the now converted search results e-mail message to the corresponding Lotus Notes server 13, 23 and 33 connected to the end user 10, 20 and 30 or designated e-mail account. The retrieved search results e-mail message can then be opened by an authorized user.

Figure 2:
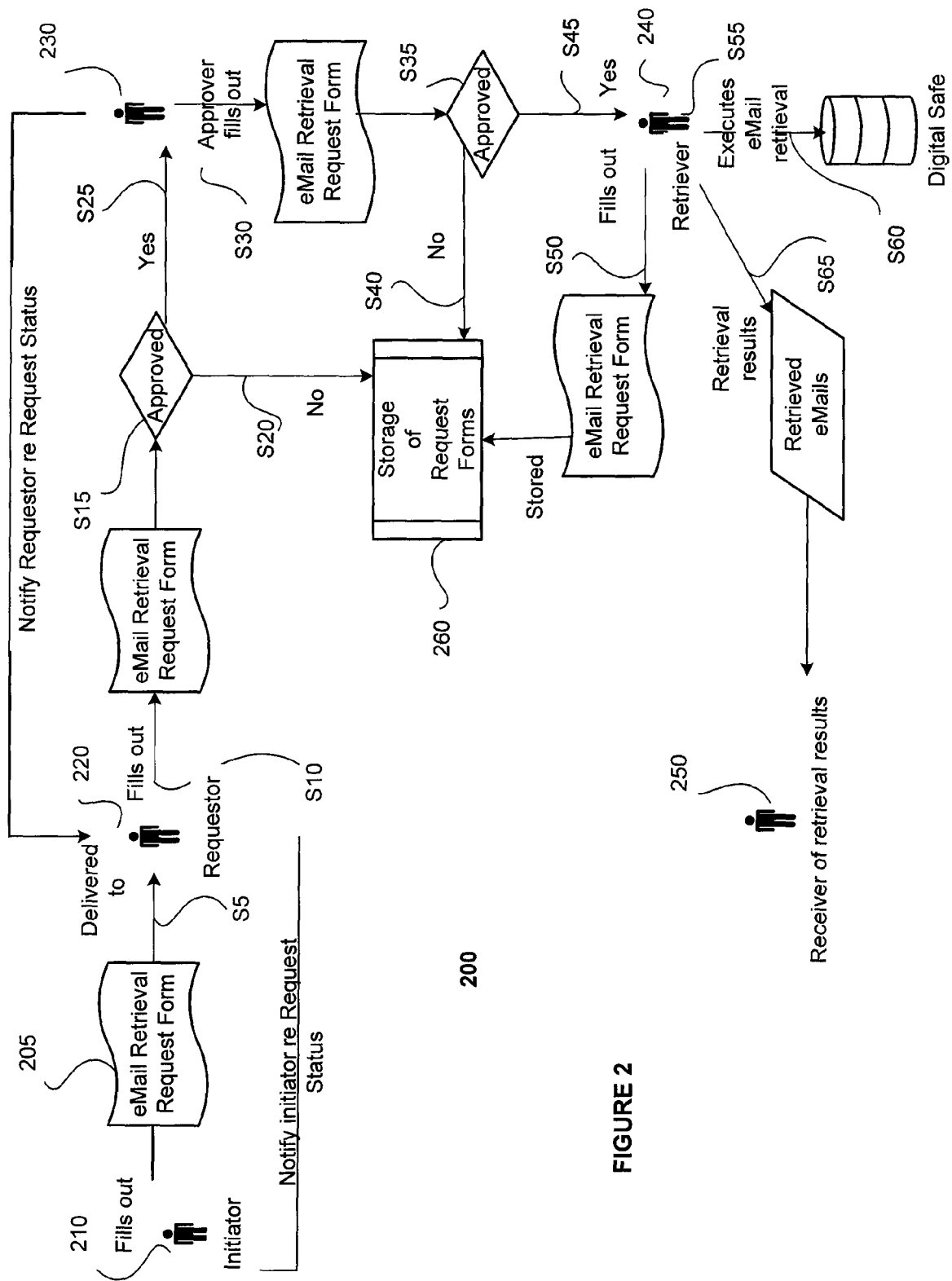
FIG. 2 illustrates a process for retrieval of electronic communications from a third party storage location according to one aspect of the present subject matter.

The archival and retrieval system 100 having the message relay complex 50 of the present subject matter provides a variety of advantageous capabilities, including among others: Automatic capture of all e-mail messages to and from an e-mail application, e.g., Lotus Notes; Restrict email capture to designated people or groups of people; Capture encrypted e-mail application messages, both sent and received; Capture copy protected e-mail application messages, both sent and received; Contain error messages to a central component, e.g., the message relay complex 50; Support at least 125,000 mailboxes; Support forty-six (46) Tbytes/year of storage expandable to one hundred (100) Tbytes/year; Preserve records in a non-erasable, non-rewriteable format; Provide a control mechanism to verify the quality and accuracy of the storage media; Serialize the units of storage media; Include time-date stamp required for period of retention; Provide the capability and capacity to readily download indexes and records; Separately store a duplicate copy of records; capability to define, configure and modify retention periods; Delete data and pointers/indexes to data; Support NASD Regulations 3010 & 3110; Establish multi-level security access; Restrict "anonymous retrieval"; Support a minimum of 128 Bit encryption of content store; Permit the access and download of stored records; and the capability to search and retrieve records by content of message, content of subject line, keywords, sender (from), receiver (to), CC, BCC, date sent, content of attachment and type of message through a web-based user interface by one or more users or organization compliance user FIG. 2 shows a flow diagram illustrating a retrieval process 200 for retrieval of archived electronic communications in the archival and retrieval system 100 of FIG. 1 from a designated storage medium, e.g., storage medium 60, according to one aspect of the present subject matter. Roles and responsibilities may be defined in order to provide additional security and ensure that only designated and authorized individuals can request and access archived communications and materials. The roles and responsibilities can serve as points of control to insure that the access to e-mail communication and information meets legal standards and regulations promulgated by an authoritative organization or governmental agency, e.g., the securities and exchange commission (SEC).

The system may include rules that relate to government laws and regulations. Such government laws and regulations may comprise Security and Exchange Commission (SEC) regulations, The Sarbanes-Oxley Act, Food and Drug Administration (FDA) regulations, Federal Trade Commission (FTC) regulations, Federal Communications Commission (FCC) regulations, Department of Defense (DoD) regulations, The Health Insurance Portability and Accountability Act (HIPAA), and/or Department of Homeland Security regulations and Transportation Security Administration (TSA) regulations. In an embodiment, the rules may relate to the industry standards. The industry standards may comprise standards related to healthcare, defense, manufacturing, telecommunications, transportation, automobiles, entertainment, law, electronics, computers, information technology, pharmaceuticals, food and/or food distribution. In an embodiment, the rules may relate to administrative policies. The administrative policies may comprise legal policies, human resources policies, information technology policies, payroll policies, compensation policies, finance policies, marketing policies, sales policies, customer service policies, investor relations policies and/or public relations policies.

In one case, the roles and responsibilities in the retrieval process can be defined as: an initiator 210, a requestor 220, an approver 230, a retriever 240 and a receiver 250. Those of ordinary skill in the art will readily recognize that more or less roles may be used in the retrieval process 200. For example, in another case, the roles and responsibilities in the retrieval process can be defined as: a requestor 220, an approver 230, and a retriever 240.

In one aspect, the initiator 210 can be an individual, such as a manager in the organization, that is permitted to initiate a formal request for retrieval of an archived e-mail or other electronic communication by partially or completely filling out an E-Mail Retrieval Request Form 205. The information submitted or fields completed by the initiator 205 can include: Date Request Initiated, Reason for Request, Parameters of Request, the name of the Receiver(s) 250 who can or should receive the retrieval results and any Initiator 210 notes or instructions. The initiator 210 is also responsible for forwarding the request form 205 to a requestor 220.

The requestor 220 is responsible for reviewing the request 205 and either approves, denies or cancels the request 205. The requestor 220 receives the e-mail retrieval request form 205 from the initiator 210 and fills in appropriate fields relevant to the request form 205. The requesters 220 then performs the initial approval determination for the retrieval request form 205 and any due diligence and examination required in applicable department or organization procedures and guidelines.

The requestor 220 can be selected and assigned by a department or organization to review requests forms 205 for retrieval of archived e-mail communications. The requester 220 may determine whether or not to approve the request 205 based on a set of pre-existing or pre-defined approval guidelines. The requester 220 may be continuously available to the initiator 210 to act on any request form 205 submitted. Also, in one aspect, the requestor 220 has primary responsibility for moving the request 205 through the approval process 200 and forwarding the request 205 on to the approver 230 as quickly as possible.

A requestor 220 can review the request 205 or can reassign the request 205 to another requestor. Depending on the reasons for a request 205, a request 205 may be assigned to a specific requestor 220 within a group of requestors 220 so that a designated and appropriate requestor 220 reviews the request 205. For example, if there is suspicion of fraud, the request 205 can be routed to a requester 220 representing the fraud department in the organization. The requestor 220 can also delegate the decision making on a request 205 but retains responsibility for approvals made in their name.

The assigned requester 220 reviews the request 205 and either approves, denies or cancels the request 205. In reviewing the request 205, the requester 220 determines whether the request 205 complies with applicable department criteria or guidelines for approval. Approval criteria may vary or be specific to departments in an organization. For example, the approval criteria may be different for organization departments such as legal, compliance and fraud, etc. Also, approval may be dependent on meeting one or more of the outlined department criteria as pre-determined by the organization. Those of ordinary skill in the art will readily recognize that the approval criteria may be the same or different for each department in the organization in order to meet any specific need for a particular department.

In one aspect, the criteria for approval for an e-mail retrieval request 205 may be outlined as follows for the following departments: Legal—The request must be related to an active, pending or threatened legal matter; Employee Law—The request must be related to an active, pending or potential employee matter; Risk Mitigation—a) Has the advisor moved to the competition?, b) Does the advisor leaving have more than 10M in assets?, c) Does the advisor who is leaving have more than 100 clients? and d) Is the advisor who is leaving from California and P2?; Compliance—a) Surveillance criteria—Potential or open client complaint, regulatory request, internal inquiry, or internal or external investigation and b) Potential suspicious activity of a client and/or advisor, or a regulatory request; Fraud—The request must pertain to a report of an active investigation or the alleged activity of an employee engaged in misconduct, which may be criminal in nature; and Employee Relations—The request must be related to an active employee matter being handled in Employee Relations.

If the request 205 is cancelled or denied, it cannot be processed further and is stored 260 for record keeping purposes. If the request 205 is approved, the requestor 220 is then responsible for delivering the request form 205 to an approver 230. The approver 230 can be in the same or different department as the requestor 220.

The approver 230 is responsible for reviewing the request 205 and either approves, denies or cancels the request 205. The approver 220 receives the request form 205 from the requester and fills in the request form 205 fields with relevant and appropriate information. The approver 230 reviews the request 205 and makes a determination whether the request 205 complies with applicable department or organization criteria or guidelines for approval. For example, applicable department criteria, such as those described above.

In one aspect, the approver 230 can also be responsible for contacting and notifying a compliance security officer (CSO), not shown, whether any requestor 220 or retriever 240 in their area or department of responsibility has been terminated, has moved on to another organization or has change duties. Such a communication with a CSO permits the organization to maintain a controlled and limited access to archived communications. If such an individual has moved or changed duties, their authorization and access is immediately revoked by the CSO.

In one aspect, where communication with a compliance security officer (CSO) is an option, the CSO may have the following responsibilities in an archival retrieval process 200, among other duties. The CSO can be the point of communication for security questions; Administer all access to the archival and retrieval system 100; Authorize/deny access to the archival and retrieval system 100; Retriever of lost passwords; Reviewer of invalid login attempts; Oversee assignment of roles and necessary access; Oversee assignment/ maintenance of roles in Lotus Notes Retrieval Request Database for requesters 220, approvers 230, auditors and retrievers 240; Determine appropriate access options for all users of the archival and retrieval system 100; Maintain a master list of all audit services request (ASR) forms sent the third party storage system 54; Report monthly on completion time of requests against standards; Give approval on destruction of data in the third party storage system 54 once the data has passed its retention period;

Apply holds on data not to be destroyed and manage the process to log hold requests and ensure data is held; Be the primary owner of a relationship with the third party storage system 54; Monitor the request process and modify as needed; Monitor that requests 205 are completing their life cycle in appropriate timeframes; Compare requests to requests denied; and technical support of a request database.

An approver 230 may be predetermined and assigned by department to review e-mail retrieval request form 205 forwarded to them by specific or designated requesters 220. The approver 230 may be continuously available to the requestor 220 to act on any request forms 205 forwarded by the requestor 220. A request 205 may be assigned to a specific approver 230 within a group or the organization. If an assigned or responsible approver 230 is unavailable, for example, due to illness, out of the office, etc., the approver 220 may select or contact any one of a number of authorized approvers 230. An emergency or back-up approver can review the request 205 and either approve, deny or cancel the request 205 based on whether the approval criteria or guidelines for an applicable department are met, such as the department criteria outlined above which may be available to all approvers 230.

The approver 230 can review a request 205 or can reassign the request 205 to another approver in the organization. The approver 230 can also delegate the decision making on a request 205 to another approver. However, the approver 230 retains responsibility for approvals made in their name. The assigned approver 230 reviews the request 205 and either approves, denies or cancels the request 205. In reviewing the request 205, the approver 230 determines whether the request 205 complies with applicable department criteria or guidelines for approval. If the request 205 is cancelled or denied, it cannot be processed further and is stored 260 for record keeping purposes. If the request 205 is approved, the approver 230 is then responsible for, delivering the request form 205 to a retriever 240.

The retriever 240 is responsible for reviewing the request 205 and executing the search. The retriever 240 receives the e-mail retrieval request form 205 and fills in any necessary or relevant information on the request form 205. The retriever 240 is assigned or selected by the organization to review the e-mail retrieval request form 205 forwarded to them by the approver 230. The number of retrievers 240 may be limited to ensure that access to the stored electronic communications and e-mails is limited to a finite number of retrievers 240 in order to maintain or increase the security of the store e-mails. For example, the number of retrievers 240 in an organization may be limited to a group of 5-10 people or other selected number of select individuals. For a particular request 205, the assigned retriever 240 reviews the request 205 or can reassign the request 205 to another retriever in the organization or retriever group. In an embodiment of the archiving and retrieval system 100, the retriever 240 cannot delegate the retrieval function or share their passwords with anyone else.

The assigned retriever 240 will review the request 205, and execute the search. The retriever 240 executes the approved request for retrieval of electronic communications, e-mails or documents. The retriever 240 can execute a search of archived e-mails using a query function that will search data and information stored on the external or third party storage medium 60 to fulfill the approved request 205. In addition, the system can maintains a record of individuals who have logged-on, of connected sessions and of search queries, so that activity on the system can be tracked, stored and correlated to a specific search requests 205. The retriever 240 will then deliver the retrieval results to a designated person(s) or a receiver 250 indicated on the request form 205.

In another aspect, before executing a search for the received request 205, the retriever 240 can first determine whether he/she has the capacity or capability to fulfill the received request 205. For example, the retriever 240 can consider whether or not they can fulfill the request 205, whether the request 205 is too large or whether the request will result in a large volume of e-mails. If the retriever 240 determines that the request 205 is too large and complex, and/or will result in a large volume of e-mails, the retriever 240 may determine that they cannot execute the request 205 with their present capabilities. If this is the case, the retriever 240 may decide that the best course of action is to process an audit services request (ASR) due to the complexity of the search, the complexity of the data, and/or the large volume of e-mails that may be returned.

In such a case, the retriever 240 can submit and process an ASR to an archiving system administrator that can process and execute the request 205. The retriever 240 records the date and time the ASR was submitted. The retriever 240 may maintain overall responsibility of the search request 205. The retriever will follow and monitor the ASR and maintain control of the retrieval process. The retriever 240 may be the main contact person for the out-sourced search request, and any questions or issues that may arise during the search are addressed by the retriever 240. The retriever 240 receives the search results from the third party system administrator and is responsible for forwarding the results to the receiver 250 or other designated individual. The retriever 240 may receive the e-mail search results at an e-mail account, e.g., retriever)@aexp.com, or to another designated delivery location or medium. The retriever 240 will receive the retrieved e-mail request results, records the date and time they were received, and records the date and time the search results were delivered to the receiver 250. At that point the request is fulfilled.

In one embodiment, the audit services request (ASR) can be processed as follows: 1) the retriever 240 fills out an ASR form using the information on the request 205; 2) the retriever 240 transmits, e.g., via fax, the ASR to the third party system 55, and may follow up with a phone call to verify receipt of the request and to discuss the urgency of the search request; 3) the third party system 55 e-mails the retriever 240 a confirmation the request was received and provides a tracking service for the request. The retriever 240 can record this on the request 204 in a database; 4) the third party system 55 sends the retriever 240 an e-mail with an estimate of the processing cost of the ASR; 5) the retriever 240 can attach the ASR cost estimate of costs to the request 205. The retriever 240 can then forward the ASR cost estimate e-mail to the approver 230 who approved the request 205, asking for an e-mail verifying their approval of the expenditure; 6) the approver 230 can return the retriever's 240 e-mail with a statement for approval or denial of the expenditure; 7) The retriever 240 can then attach the response to the request 205 keep a record with the Request; 8) the retriever 240 can then transmit a copy of the approver's 230 e-mail and with a copy of the cost to the third party system 55; and 9) The retriever 240 can also call the third party system 55 to let them know of the approver's 230 decision.

If the ASR was approved: a) the retriever 240 can record the "Retrieval Requested" date, time and notes in the request 205; b) the approval email can also be sent to the compliance security officer (CSO) or their designee for verification against future invoices; c) Upon receipt of the approval of the work estimate, the third party system 55 can schedule the work based on the current workload and queue of scheduled audits, then provides the retriever 240 with a "Results Delivery Date"; d) the third party system 55 can send an e-mail to the retriever 240 with delivery details and the retriever 240 can update the request tracking information; e) the third party system 55 can call the retriever 240 and give the pass phrase for the encrypted information sent and send instructions on how to read the encrypted information; and f) the retriever 240 can also track delivery of the encrypted information.

If the approver 230 does not approve the ASR, the retriever 240 can contact the requestor 220 and discuss changes in the parameters of the e-mail retrieval request 205. They can then either choose to repeat the process with a modified ASR, or the retriever 240 can cancel the request 205, making notes as to the reason for the cancellation.

The receiver 250 may be the same or different individual than the person who initiated, i.e., the initiator 210, the original request for retrieval of electronic communications, e.g., e-mails. In one aspect, the receiver 250, may instead be designated as an Actual Requestor. The receiver 250 or actual requestor can be responsible for ensuring that the retrieved e-mail is protected and secure, and destroyed on a designated destruction date. The receiver 250 is aware of the destruction date for the e-mail and for seeing that the email is destroyed by that date. In one case, the destruction date for e-mails is three (3) years from the date the e-mail was created, i.e., the original "Sent Date". If the e-mail is under a Hold Order, the destruction date may be different. Destruction of the e-mail can include all media where the e-mail might be stored, e.g., paper, Lotus Notes machines, word documents, CDs, DVDs, diskettes, etc.

Referring now to FIG. 2, a flow diagram of a retrieval process 200 for requesting, approving and retrieving archived electronic communications from an archiving system 55 storage medium 60 is shown. The retrieval process 200 enables an organization to quickly and easily respond to a request for e-mail or other electronic records by a regulatory or governmental agency, such as the securities and exchange commission. The retrieval process establishes a formal procedure to request and approve the extraction of e-mail records and communications from storage archives 60.

In step, S5, the initiator 210 initiates a request 205 for retrieval of an archived e-mail or other electronic communication. The request can be initiated, for example, by partially or completely filling out a retrieval request form 205 and forwarding the request form 205 to a requester 220. In some cases, the request 205 may be related to an active, pending or threatened legal matter.

In step S10, the requestor 220 receives the request 205 and fills in any appropriate fields relevant to the requestor 220.

In step S15, the requestor 220 reviews the request 205 and will either approve the request 205 or deny and cancel the request 205. In reviewing the request 205, the requester 220 can consult a first set of applicable department criteria or guidelines to make an approval determination.

In step S20, if the retrieval request 205 is denied and cancelled, the request form 205 will not be processed further and is stored for record keeping purposes. The cancelled or denied request form 205 can be stored on in organization's data storage medium 260 or other accessible storage medium. Also, the initiator 210 is notified that the request 205 is denied and cancelled.

In step S25, if the retrieval request 205 is approved, the request 205 is sent to an approver 230. In step S30, the approver 230 receives the retrieval request 205 and then fills in relevant and appropriate information related to the approver 230.

In step S35, the approver 230 reviews the request 205 and will approve or deny and cancel the request 205. In reviewing the request 205, the approver 230 can consult a second set of applicable department criteria or guidelines to make an approval determination. Those of ordinary skill in the art will readily recognize that the first and second set of criteria or guidelines may have similar, identical or different content depending on the needs of the organization.

In step S40, if the retrieval request 205 is denied and cancelled, the request form 205 will not be processed further and is stored for record keeping purposes. The cancelled or denied request form 205 can be stored on in organization's data storage medium 260 or other accessible storage medium. The requestor 220 is notified that the request 205 is denied and cancelled.

In step S45, if the retrieval request 205 is approved, the request 205 is sent to a retriever 240. In step S50, the retriever 240 receives the e-mail retrieval request form 205 and fills in relevant and appropriate information related to the retriever 240.

In step S55, the retriever 240 reviews the request 205 and executes the search request 205. Additionally, in one aspect, the retriever 240 also determines whether it has the capacity or capability to fulfill the received request 205. The retriever 240 can consider whether the search result set may be too large, e.g., more than 2,500 e-mails, whether the query is very complex or the data is complex. If the retriever 240 determines that the request 205 is too large and complex, and will/or result in a large volume of e-mails, the retriever 240 may decide to request and process an audit search request (ASR).

In step S60, if the retrieval request 205 is executed, the retriever 240 queries the storage location 60. The requested electronic communications archived in the storage medium 60 are accessed, either directly or through an approved ASR, and retrieved. In step S65, the retriever 240 delivers the retrieved electronic communication results to a designated person or receiver 250 indicated on the request form 205.

In one aspect of this process 200, a time constraint or time limit may be imposed that requires a fixed time period for completion of the retrieval process from the original request to the fulfillment of the request, e.g., retrieval process may not to exceed 24 hours. Further, implementation of this retrieval process 200 permits monitoring and feedback about the archiving and retrieval system 100 that enables auditable feedback about itself 100. For example, what requests have been made, what requests have been approved, what retrievals have been executed, whether all retrievals had matching approvals, etc. The archival and retrieval system 100 can also record all activity related to the creation, approval and fulfillment of the search and retrieval requests.

Those of skill in the art will recognize that many of the functions and aspects of the system can be implemented on a computer or computers, which may be connected for data communication via components of a network. The hardware of such computer platforms typically is general purpose in nature, albeit with an appropriate network connection for communication via the intranet, the Internet and/or other data networks As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse, a trackball, etc. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network. The elements of such a general-purpose computer system also may be combined with or built into routing elements or nodes of the network.

The software functionalities (e.g., many of the operations described above) involve programming of controllers, including executable code as well as associated stored data. The software code is executable by the general-purpose computer that functions as the particular computer. In operation, the executable program code and possibly the associated data are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable medium. Execution of such code by a processor of the computer platform enables the platform to implement the system or platform functions, in essentially the manner performed in the embodiments discussed and illustrated herein.

As used herein, terms such as computer or machine readable medium refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s). Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the technology disclosed herein may be implemented in various forms and examples, and that they may be applied in numerous applications, only some of which have been described herein. Those skilled in that art will recognize that the disclosed aspects may be altered or amended without departing from the true spirit and scope of the subject matter. It is intended by the following claims to claim any and all modifications and variations that fall within the true scope of the advantageous concepts disclosed herein.

We claim:

1. A computer-implemented method for retrieving electronic communications comprising:
    receiving, by a retrieval computer for retrieving the electronic communications, an electronic communication;
    reviewing, by the computer, the electronic communication to determine content of the electronic communication;
    applying, by the computer, rules to the content to determine a category associated with the electronic communication, wherein the rules relate to at least one of government laws and regulations, industry standards and administrative policies;
    storing, by the computer, the electronic communication based on the category;
    receiving, by the computer and from a first individual, a request for retrieval of the electronic communication;
    receiving, by the computer, a first approval from a first approver and a second approval second approver, wherein said second approval is based at least partially upon the first approval;
    determining, by the computer and based on at least one of the request and the first individual, that an audit of the request should be initiated; and
    delivering, by the computer and in response to the audit, the retrieved archived electronic communication to a designated location.

2. The method of claim 1, wherein the rules relate to the government laws and regulations, and wherein the government laws and regulations comprise at least one of: Security and Exchange Commission (SEC) regulations, The Sarbanes-Oxley Act, Food and Drug Administration (FDA) regulations, Federal Trade Commission (FTC) regulations, Federal Communications Commission (FCC) regulations, Department of Defense (DoD) regulations, The Health Insurance Portability and Accountability Act (HIPAA), Department of Homeland Security regulations and Transportation Security Administration (TSA) regulations.

3. The method of claim 1, wherein the rules relate to the industry standards, and wherein the industry standards comprise standards related to at least one of: healthcare, defense, manufacturing, telecommunications, transportation, automobiles, entertainment, law, electronics, computers, information technology, pharmaceuticals, food and food distribution.

4. The method of claim 1, wherein the rules relate to the administrative policies, and wherein the administrative policies comprise at least one of: legal policies, human resources policies, information technology policies, payroll policies, compensation policies, finance policies, marketing policies, sales policies, customer service policies, investor relations policies and public relations policies.

5. The method of claim 1, further comprising moving the electronic communication to a second storage location.

6. The method of claim 5, wherein the second storage location comprises at least one of a second server and a second database.

7. The method of claim 5, wherein moving comprises transmitting the electronic communication over a network.

8. The method of claim 5, wherein moving comprises transmitting the electronic communication over a network, storing the electronic communication in the second storage location and transmitting a confirmation message after the successful storing of the electronic communication.

9. The method of claim 8, wherein transmitting a confirmation message further comprises creating and storing an error message when the electronic communication is not successfully stored.

10. The method of claim 1, further comprising converting the electronic communication into a second data format.

11. The method of claim 1, further comprising retrieving the electronic communication.

12. The method of claim 1, further comprising receiving a retrieval request associated with the category and retrieving the electronic communication based upon the retrieval request.

13. The method of claim 1, further comprising:
    receiving, from a requestor, a retrieval request associated with the category;
    retrieving the electronic communication based upon the retrieval request; and,
    transmitting the electronic communication to the requestor.

14. A computer-implemented method for retrieving electronic communications comprising:
    receiving, by a retrieval computer for retrieving the electronic communications, an electronic communication;
    reviewing, by the computer, the electronic communication to determine content of the electronic communication;
    applying, by the computer, rules to the content to determine a category associated with the electronic communication, wherein the rules relate to at least one of government laws and regulations, industry standards and administrative policies; and,
    storing, by the computer, the electronic communication based on the category;
    wherein a first individual initiates a request for retrieval of the electronic communication;
    wherein a second individual determines whether the request meets a first approval criteria and notifying the first individual of the determination;
    wherein, in response to the request meeting the first approval criteria, a third individual reviews the request and determining whether the request meets a second approval criteria and notifying the second individual of the determination;
    wherein a fourth individual determines whether to initiate an audit service request;
    wherein the fourth individual executes the request to access and retrieve said archived electronic communication from the third party storage medium when the audit service request is not processed;
    wherein the third party executes the request to access and retrieve the archived electronic communication from the third party storage medium when said audit services request is approved; and
    delivering, by the computer, the retrieved archived electronic communication to a designated individual.

15. A system for archiving electronic communications comprising:
    a network interface communicating with a non-transitory memory;
    the memory communicating with a processor for archiving electronic communications; and
    the processor, when executing a computer program, is configured to:
    receive, by the processor, an electronic communication;
    review, by the processor, the electronic communication to determine content of the electronic communication;
    apply, by the processor, rules to the content to determine a category associated with the electronic communication, wherein the rules relate to at least one of federal law, federal government regulations, state law, state government regulations, industry standards and administrative policies; and, store, by the processor, the electronic communication based on the category.

receive, by the processor and from a first individual, a request for retrieval of the electronic communication;

receive, by the processor, a first approval from a first approver and a second approval second approver, wherein said second approval is based at least partially upon the approval of the first approval;

determine, by the processor and based on at least one of the request and the first individual, that an audit of the request should be initiated;

deliver, by the processor and in response to the audit, the retrieved archived electronic communication to a designated location.

* * * * *

UNITED STATES PATENT AND TRADEMARK OFFICE
CERTIFICATE OF CORRECTION

PATENT NO. : 7,933,860 B2
APPLICATION NO. : 12/127767
DATED : April 26, 2011
INVENTOR(S) : Asselstine et al.

Page 1 of 1

It is certified that error appears in the above-identified patent and that said Letters Patent is hereby corrected as shown below:

In Column 19 line 18, after second approval insert therefor --from a--.

In Column 19 line 19, please delete "said" and insert therefor --the--.

In Column 19 line 56, after wherein insert therefor --the--.

In Column 19 line 58, after wherein insert therefor --the--.

In Column 19 line 63, after wherein insert therefor --the--.

In Column 21 line 6, after second approval insert therefor --from a--.

In Column 21 line 7, please delete "said" and insert therefor --the--.

Signed and Sealed this
Thirty-first Day of May, 2011

David J. Kappos
*Director of the United States Patent and Trademark Office*